United States Patent
Fleischer

(10) Patent No.: US 8,875,563 B2
(45) Date of Patent: Nov. 4, 2014

(54) COLLECTING LINE FOR MONITORING AND LOCATING LEAKAGES AND DEVICE HAVING THE COLLECTING LINE

(75) Inventor: Patrick Fleischer, Petershausen (DE)

(73) Assignee: Areva GmbH, Erlangen (DE)

(*) Notice: Subject to any disclaimer, the term of this patent is extended or adjusted under 35 U.S.C. 154(b) by 942 days.

(21) Appl. No.: 12/479,246

(22) Filed: Jun. 5, 2009

(65) Prior Publication Data
US 2009/0293591 A1 Dec. 3, 2009

Related U.S. Application Data

(63) Continuation of application No. PCT/EP2008/060229, filed on Aug. 4, 2008.

(30) Foreign Application Priority Data

Sep. 5, 2007 (DE) .......................... 10 2007 042 160

(51) Int. Cl.
*G01M 3/02* (2006.01)
*G01M 3/22* (2006.01)
*F17D 5/02* (2006.01)

(52) U.S. Cl.
CPC ..... *F17D 5/02* (2013.01); *G01M 3/22* (2013.01)
USPC ............. 73/52; 738/863; 738/23; 738/864.33

(58) Field of Classification Search
USPC ...................................................... 73/863.23
See application file for complete search history.

(56) References Cited

U.S. PATENT DOCUMENTS

| | | | |
|---|---|---|---|
| 3,977,233 A | 8/1976 | Issel | |
| 4,255,072 A * | 3/1981 | Gappa et al. | 406/89 |
| 4,735,095 A | 4/1988 | Issel | |
| 5,046,353 A * | 9/1991 | Thompson | 73/40.7 |
| 7,270,019 B2 | 9/2007 | Issel | |

FOREIGN PATENT DOCUMENTS

| | | |
|---|---|---|
| DE | 24 31 907 C3 | 1/1976 |
| DE | 34 34 322 A1 | 3/1986 |
| EP | 0 175 219 A1 | 3/1986 |
| WO | 2006/122696 A1 | 11/2006 |

OTHER PUBLICATIONS

International Search Report, dated Jan. 20, 2009.

* cited by examiner

*Primary Examiner* — Paul West
(74) *Attorney, Agent, or Firm* — Laurence A. Greenberg; Werner H. Stemer; Ralph E. Locher

(57) ABSTRACT

A collecting line for leakage monitoring in an installation is permeable to a substance to be monitored in at least one subarea extending along the longitudinal direction. The collecting line is formed of at least two subsections that are spaced from a first end of the collecting line. The distance between the second subsection and the first end is larger than the distance between the first subsection and the first end. The permeability to the substance to be monitored is higher in the first subsection than in the second subsection. A device having the collecting line is also provided.

18 Claims, 6 Drawing Sheets

COLLECTING LINE FOR MONITORING AND LOCATING LEAKAGES AND DEVICE HAVING THE COLLECTING LINE

CROSS-REFERENCE TO RELATED APPLICATION

This is a continuation, under 35 U.S.C. §120, of copending International Application No. PCT/EP2008/060229, filed Aug. 4, 2008, which designated the United States; this application also claims the priority, under 35 U.S.C. §119, of German Patent Application DE 10 2007 042 160.7, filed Sep. 5, 2007; the prior applications are herewith incorporated by reference in their entirety.

BACKGROUND OF THE INVENTION

Field of the Invention

The invention relates to a collecting line for monitoring and locating leakages in an installation. The invention additionally relates to a device for monitoring and locating leakages with such a collecting line.

European Patent EP 0 175 219 B1 and German Published, Non-Prosecuted Patent Application DE 34 34 322 A1, both corresponding to U.S. Pat. No. 4,735,095, disclose a collecting line which is used to monitor and locate leakages. That line includes a pipe, also referred to as an interior line, which is impermeable to a substance to be monitored. The pipe is provided with a large number of openings which are spaced apart from one another in their longitudinal direction and which, for example in the embodiment known from German Published, Non-Prosecuted Patent Application DE 34 34 322 A1, are located parallel to the longitudinal axis of the pipe in rows. A coating which is permeable to the substance to be monitored is applied around the pipe. A substance to be monitored, which leaves a part of an installation through a leakage into the area surrounding the collecting line, can penetrate the collecting line through the openings in the pipe. After some time, an image of the concentration distribution of the substance to be monitored surrounding the collecting line forms in that manner inside the collecting line.

A method known from German Patent DE 24 31 907 C3, corresponding to U.S. Pat. No. 3,977,233, can then be used to ascertain the location of a leakage at which the substance has penetrated the collecting line. That location corresponds to the place (the leakage location) at which the substance left the installation part to be monitored. For that purpose, a pump connected to the collecting line is used to feed the substance, which has penetrated the collecting line, together with a carrier gas which is located in the collecting line, to a sensor which is likewise connected to the collecting line. If the flow rate is known, the location at which the substance to be monitored penetrates the collecting line and thus the leakage location in the part of the installation can be ascertained from the time from when the pump is switched on to when the substance to be monitored reaches the sensor.

In the known collecting line, the permeability for the substance to be monitored is constant in the course of the longitudinal direction. That is due to the distribution, which is uniform in the longitudinal direction, of the openings and their uniform nature, and to the homogeneity of all the materials used. In practice, however, it has been observed that the detection sensitivity decreases as the distance of the leakage location to the sensor increases. In other words: the further away the leakage location is from the sensor, the higher must the concentration of the substance, which has penetrated, be there so that it can still be detected using the sensor.

SUMMARY OF THE INVENTION

It is accordingly an object of the invention to provide a collecting line for monitoring and locating leakages and a device having the collecting line, which overcome the hereinafore-mentioned disadvantages of the heretofore-known devices of this general type and in which a decrease in detection sensitivity as a distance to a sensor increases, is reduced as compared to known collecting lines.

With the foregoing and other objects in view there is provided, in accordance with the invention, a collecting line for monitoring and locating leakages at an installation. The collecting line comprises a body having first and second ends, a longitudinal direction and a subarea extending in the longitudinal direction. The body is permeable to a substance to be monitored, at least in the subarea. The subarea has at least one first subsection and at least one second subsection. The at least one first subsection is disposed at a first distance from the first end, and the at least one second subsection is disposed at a second distance from the first end being greater than the first distance. The at least one first subsection has a greater permeability than the at least one second subsection.

The present invention is based on the finding that the reduction in the detection sensitivity which accompanies the increasing distance to the sensor is substantially caused by a back diffusion of the substance which has penetrated the collecting line from the collecting line outward into the surrounding area as the substance is transported through the collecting line. Therefore, the concentration of the substance to be monitored decreases on the way to the sensor and no longer corresponds to the initial concentration which was present at the location of the leakage in the collecting line.

The longer the period of time taken by the pumped-off substance from the location of the leakage to the sensor, the larger the decrease in the concentration. This means in turn that identical concentrations of the substance to be monitored in the collecting line, which are present at various locations and thus at various distances to the sensor, result in various measurement values with respect to the concentration at the sensor.

Another effect of the back diffusion is that if leakage locations are very far away from the sensor, the concentration of the substance which has penetrated the collecting line must be sufficiently large for a concentration at the sensor during a pumping-off operation to be reached which is sufficiently large for it to be capable of being detected reliably. In order to achieve such a sufficiently large (initial) concentration in the collecting line, the collecting time, i.e. the time between two pumping operations, must therefore be selected to be sufficiently long. In the case of long monitoring distances, that results in long monitoring time intervals.

It is now achieved by virtue of the features of the present invention that in subsections with greater permeability, the substance to be monitored can diffuse more quickly into the collecting line, with the result that an increased concentration of the substance is thus achieved inside the collecting line within a shorter period of time. A collecting line of this type can now be connected to a sensor in such a way that, as the distance to it decreases, the permeability of the collecting line is decreased. This ensures that, despite the back diffusion during the pumping-off phase, even in the case of long collecting line lengths, a sufficiently high concentration of the substance to be monitored reaches the sensor. Thus, the sensitivity of the measurement system for leakage locations which are far away from the measurement system, is increased.

Another advantage of the invention is that due to the faster diffusion achieved of the substance to be monitored into the collecting line at places which are remote from the sensor with a given length and detection sensitivity of the collecting line, the detection time is decreased. It is also possible to lengthen the collecting line with a given detection time, since at locations which are further away from the sensor, due to the improved permeability in these subsections, a sufficiently high concentration in the collecting line is achieved, which can be evaluated at the sensor.

Furthermore, with a given diffusion time and monitoring length, it is possible, due to the variation of the permeability, to adjust the local detection sensitivity along the collecting line in a targeted manner.

In accordance with another feature of the invention, the permeability can continuously decrease from the first end in the direction toward the second end, as the distance in the longitudinal direction increases. In this manner, the back diffusion in the collecting line likewise continuously decreases to the sensor, with the result that uniform detection sensitivity even over long distances is made possible.

In accordance with a further feature of the invention, the collecting line expediently includes a pipe, which is provided with openings that are closed with a material which is permeable to the substance to be monitored.

In accordance with an added feature of the invention, in order to ensure the closure of the openings of the pipe, the pipe can be coated with a layer which is permeable to the substance to be monitored.

In accordance with an additional feature of the invention, the permeability of the collecting line in the two subsections can be changed by virtue of the fact that the area formed by the openings in the first subsection is larger than in the second subsection.

In accordance with yet another feature of the invention, if the openings are disposed in at least one row which is aligned in the longitudinal direction, the production of the pipe which is provided with openings is simplified.

In accordance with yet a further preferred feature of the invention, the number of opening rows in the first subsection is greater than in the second subsection.

In accordance with yet an added preferred feature of the invention, the number of openings in an opening row in the first subsection is greater than in the second subsection.

In accordance with yet an additional feature of the invention, another possibility of varying the permeability is that of the openings in the first subsection being larger than in the second subsection.

In accordance with again another preferred feature of the invention, the material closing the openings has, in the first subsection, a greater permeability than in the second subsection.

In accordance with again a further feature of the invention, this can be achieved especially by the thickness of the permeable layer in the first subsection being smaller than in the second subsection.

In accordance with again an added feature of the invention, alternatively, the variation of the permeability can also be achieved by the composition of the material closing the openings in the first subsection being different from the composition of the material closing the openings in the second section.

With the objects of the invention in view, there is concomitantly provided a device for monitoring and locating leakages. The device comprises a collecting line according to the invention, and a sensor for the substance to be monitored. The sensor is connected to the second end of the body.

As explained above, the apparatus has a detection sensitivity even over long distances.

Other features which are considered as characteristic for the invention are set forth in the appended claims.

Although the invention is illustrated and described herein as embodied in a collecting line for monitoring and locating leakages and a device having the collecting line, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
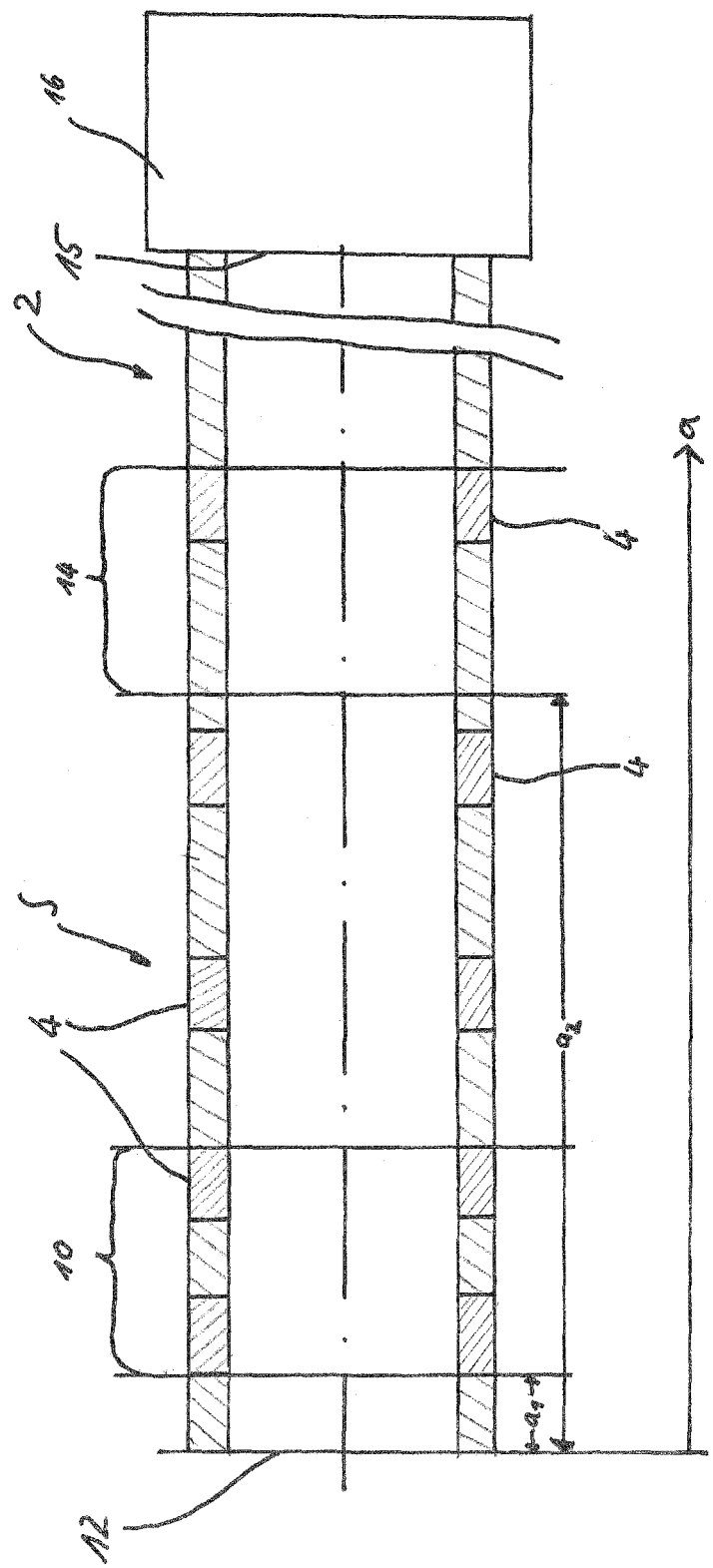
FIGS. 1 and 2 are fragmentary, diagrammatic, longitudinal-sectional views of different embodiments of collecting lines according to the invention.

Referring now to the figures of the drawings in detail and first, particularly, to FIG. 1 thereof, there is seen a collecting line shown in a longitudinal section. A body in the form of a hollow pipe 2 is provided, at least in one subarea, with a plurality of openings 4 which in turn are closed by a material that is permeable to a substance S to be monitored. The collecting line has a subarea extending in the longitudinal direction. The subarea has a first subsection 10 which is disposed at a first distance $a=a_1$ from a first end 12. The subarea has a second subsection 14 disposed at a greater, second distance $a=a_2$ from the first end 12 of the collecting line. The distance between the first end 12 of the collecting line and that end of the respective subsection that faces the first end 12, is defined in each case as the distance a. A sensor 16 for detecting the substance S is disposed at a second end 15.

In this case, the first subsection 10 has a higher permeability than the second subsection 14. This is achieved in the illustrated example by virtue of a reduction in the number of openings 4 per unit length in the direction toward the second end 15. As a result, the substance S to be monitored can penetrate the interior of the collecting line in the first subsection 10 more easily than in the second subsection 14, due to the permeable material in the openings 4. If the concentration of the substance S outside the collecting line in the first subsection 10 were identical to the concentration of the substance S outside the collecting line in the second subsection 14, the concentration of the substance S to be monitored in the interior of the collecting line would, for this reason, increase more quickly in the first subsection 10 than in the second subsection 14. If the content of the collecting line were now pumped off in the direction of the sensor 16, the concentration of the substance S to be monitored would decrease on the way to the sensor 16 due to back diffusion. However, since the concentration in the subsections 10, 14 of the collecting line is at different levels due to the varying permeabilities, the effect of the back diffusion is prevented. This is because the high permeability in subsections which are remote from the sensor 16 achieves the establishment of a high concentration of the substance S to be monitored in this case, within a short period of time. It is thus ensured that, despite the distance to the sensor 16 being long and the associated back diffusion, a sufficiently high concentration can still be measured at the location of the sensor 16. The value of the measured concentration of the substance S to be monitored in the first subsection 10 corresponds approximately to that in the second subsection 14. If the permeability in subsections which are remote from the sensor 16 were not as high, as is the case in collecting lines according to the prior art, it would be necessary to either increase the penetration time of the substance S to be monitored until a similar concentration was achieved or to limit the length of the collecting line in order to also limit the extent of back diffusion. A high detection sensitivity even in the case of long collecting lines is thus ensured by increasing the permeability in subsections which are remote from the sensor 16.

The permeability is the average value over a predetermined length of the collecting line which, in the example shown in FIG. 1, is dimensioned in such a way that it includes a large number of openings 4.

In the example shown in FIG. 1, the distance between the openings 4 increases continually in the longitudinal direction from the first end 12 to the second end 15, that is to say that the change of the permeability of the collecting line is continuous. However, a step-wise change in the permeability is also possible.

Figure 2:
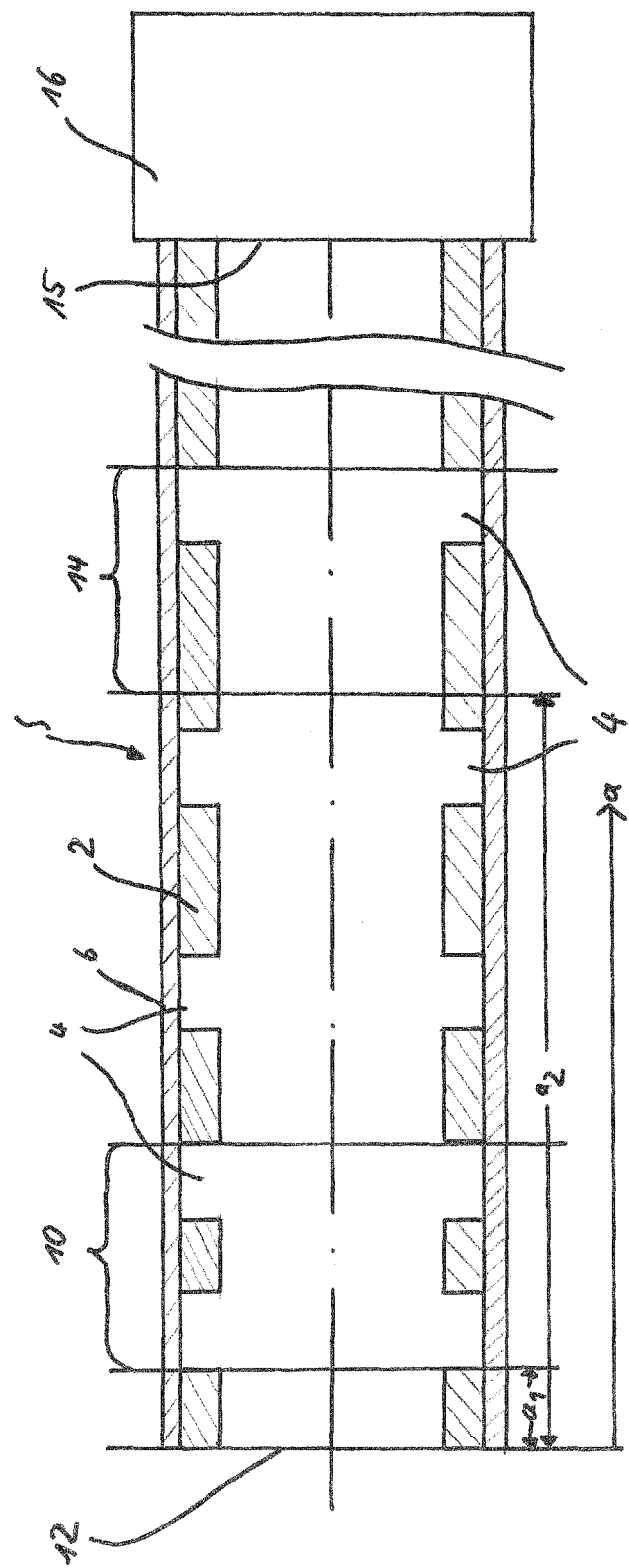

Alternatively to the exemplary embodiment illustrated in FIG. 1, where only the openings 4 are closed with a material which is permeable to the substance S to be monitored, in the collecting line according to FIG. 2, the entire pipe 2 is coated by a layer 6 which is permeable to the substance S to be monitored.

Figure 3:
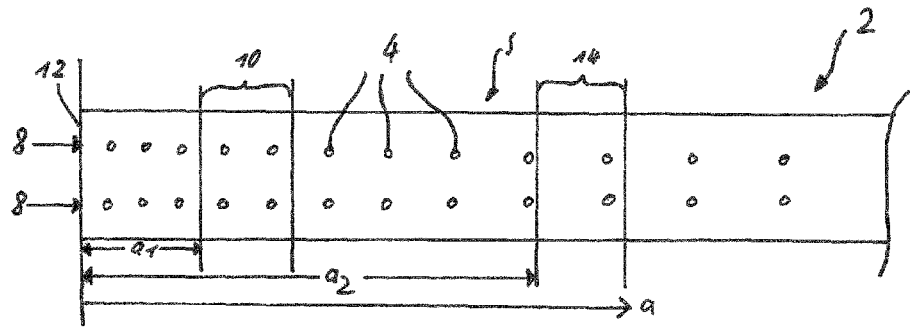
FIGS. 3, 4 and 5 are fragmentary, plan views of different embodiments of collecting lines according to the invention.

FIG. 3 shows a plan view of the pipe 2 (illustrated in FIGS. 1 and 2), from which it can be seen that the openings 4 are disposed in a plurality of opening rows 8. The change in permeability of the collecting line produced with such a pipe 2 is thus brought about by way of varying the number of openings 4 in an opening row 8. Thus, the number of openings 4 per opening row 8 is greater in the first subsection 10 than in the second subsection 14.

Figure 4:
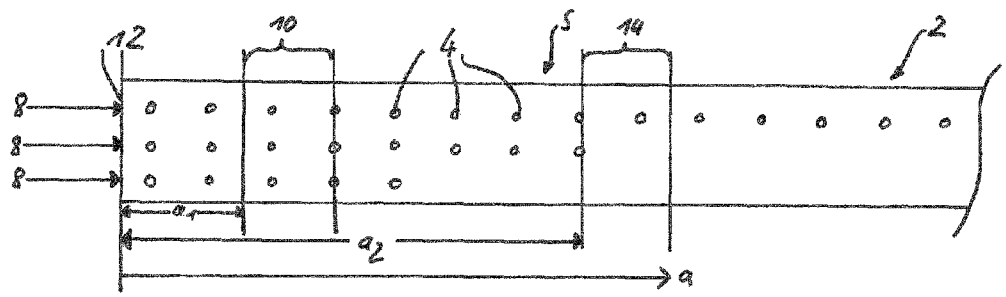

In the case of the pipe 2 which is likewise illustrated in a plan view in FIG. 4, the number of opening rows 8 decreases when viewed from the first end 12 in the longitudinal direction, with a constant distance being maintained between the openings 4 in an opening row 8. This ensures that the permeability is greater in the first subsection 10 than in the second subsection 14.

Figure 5:
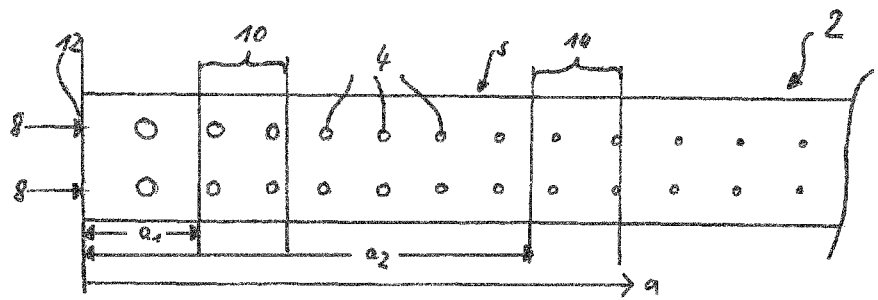

Another possibility of changing the permeability of the collecting line in the subsections 10, 14 is a variation in the opening size or clear width of the openings shown in FIG. 5. In this case, the first subsection 10 has larger openings 4 than the second subsection 14.

The measures illustrated in FIGS. 3 to 5 for varying the permeability or opening density can also be combined in this case.

Figure 6:
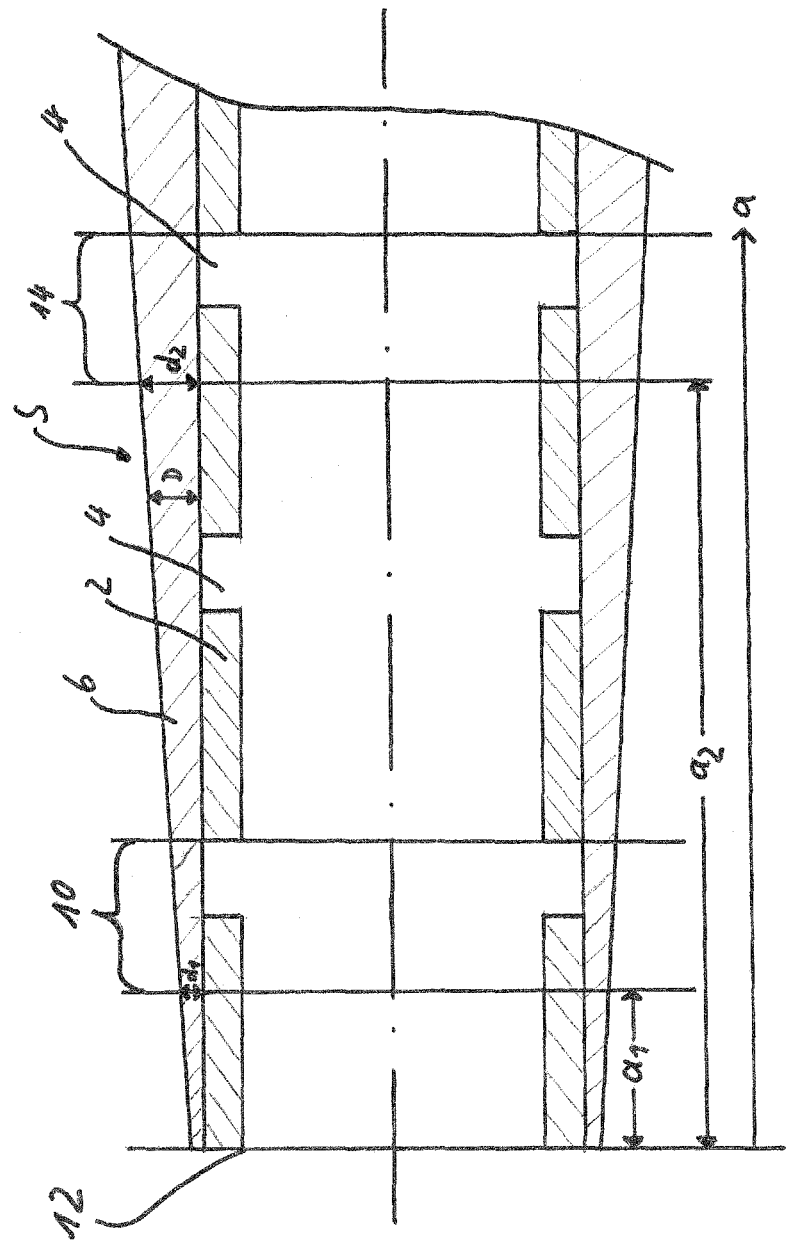
FIG. 6 is a fragmentary, longitudinal-sectional view of a collecting line according to the invention.

In the example of FIG. 6, the permeability is in turn changed by changing a layer thickness $D=D(a)$ of the layer 6 with which the collecting line is coated, as a function of a distance a. This layer thickness $D(a_1)=d_1$ is lower at the start of the first subsection 10 than at the start of the second subsection 14 ($D(a_2)=d_2$), so that the permeability is greater in the first subsection 10. In the example of FIG. 6, the layer thickness D increases continually in the longitudinal direction of the collecting line from the first end 12, within the subsections 10, 14 as well. However, it would also be possible for the layer thickness D to remain constant within one subsection and thus to increase in a step-wise manner in the longitudinal direction of the collecting line.

Figure 7:
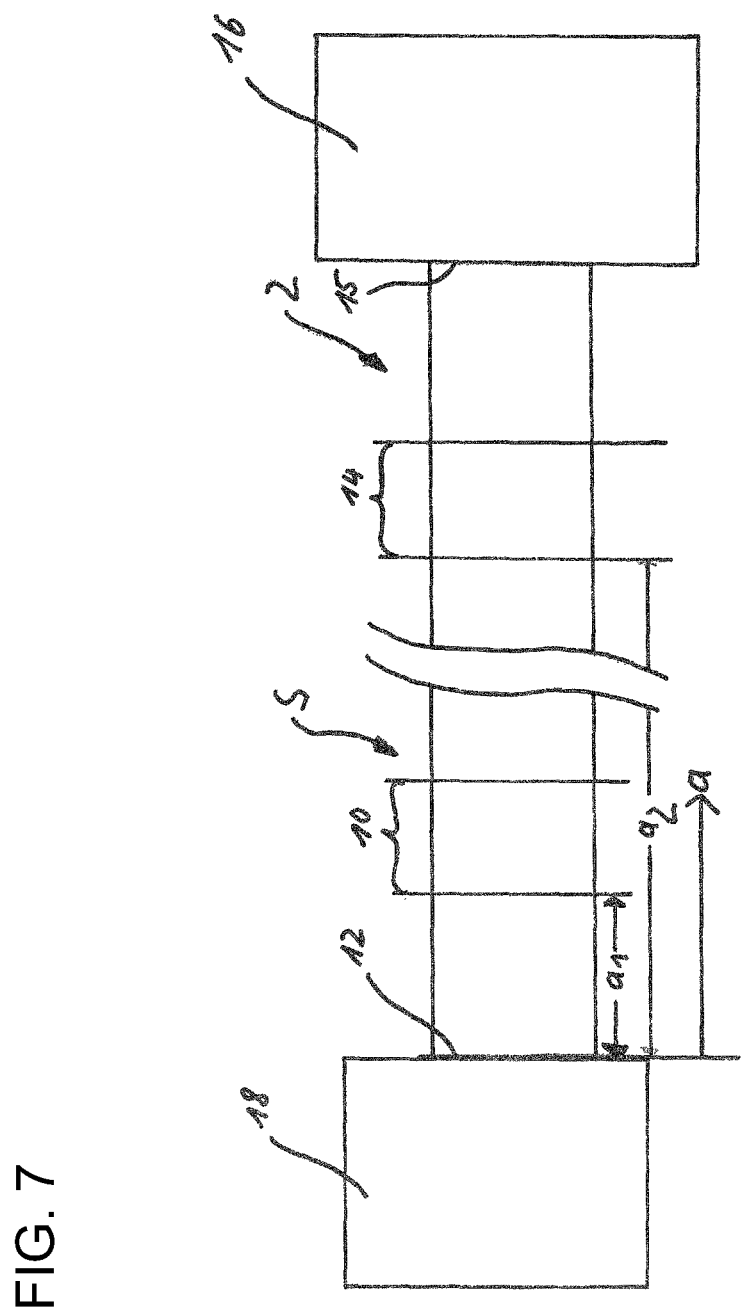
FIG. 7 is a fragmentary, plan view of a collecting line at an installation.

FIG. 7 illustrates a device with a collecting line according to one of FIGS. 1 to 6. A pressure pump 18 is connected to the first end 12 of the collecting line and pumps a transport medium located in the collecting line, with any substance which may have penetrated in the case of a leakage, to the sensor 16 that is connected to the second end 15. The collecting line is respectively connected to the pump 18 and the sensor 16 in such a way that the first subsection 10, which is disposed at a distance $a_1$ from the first end 12 and is distinguished by a greater permeability, is located further away from the sensor 16 than the second subsection 14, which is disposed at a distance $a_2$ from the first end 12 and has the lower permeability. If there is a leakage in the area of the first subsection 10, due to the great permeability, a higher concentration of the substance S to be monitored builds up there within a given time interval, than would occur in the case of an identical leakage, i.e. external concentration, in the nearby subsection 14. In other words, the concentration in the subsection 10 which is located further away from the sensor 16 is higher, as compared to the nearby subsection 14. If the content of the collecting line is now pumped toward the sensor 16, the substance S which has penetrated the collecting line in the first subsection 10 must travel a longer distance than any substance S which may have penetrated in the second subsection 14.

Along its way to the sensor 16, some of the substance S which has penetrated the collecting line diffuses to the outside. This means, in turn, that contents which are located further away from the sensor 16 show a higher concentration drop than those which are nearby. However, this effect is countered due to the higher concentration of the substance S to be monitored at locations which are remote from the sensor 16. This ensures that a measurable concentration is still available at the location of the sensor 16, despite a long distance from the remote locations the sensor 16. Due to the nature of the collecting line with varying permeabilities according to the invention, a high level of detection sensitivity is achieved even in long collecting lines.

The diagram according to FIG. 8 shows measurement results of a collecting line which is known according to the prior art. The terms which have been introduced above to describe a collecting line according to the present invention, apply in a corresponding manner to the collecting line according to the prior art. In the diagram, a concentration C of a substance S, which has penetrated the line, in a collecting line with a length l, is plotted against the distance a from the first end 12 of the collecting line when the substance S is transported, using the pump 18, to the sensor located at the distance l. The point of origin in the coordinate system corresponds to the first end 12 of the collecting line. As per the definition, the end point of the distance $a_1$ is located at the start of the first subsection 10 and the end point of the distance $a_2$ is located at the start of the second subsection 14 of the collecting line. However, in the collecting line according to the prior art, the two subsections 10, 14 have identical permeabilities.

A curve 30 illustrates a situation in which a substance S has penetrated the collecting line at the distance $a_1$, with the result that this substance S is present inside the collecting line as a concentration cushion with a concentration $C_1$. If the substance S is now pumped together with the transport medium present in the collecting line, usually air, to the second end 15 of the collecting line, its concentration gradually decreases due to back diffusion, with the result that at the location of the sensor, the substance S is now available only in a concentration $C_{1S}$.

A curve 32 shows a similar situation in which a substance S has penetrated the collecting line at the distance $a_2$, with the result that this substance S is present inside the collecting line as a concentration cushion with a concentration $C_2$. This concentration $C_2$ corresponds to the concentration $C_1$ mentioned above ($C_1=C_2$). If the substance S is now pumped, as described above, to the second end 15 of the collecting line, its concentration decreases to the value $C_{2S}$ until the location of the sensor.

Due to the longer distance to the sensor 16 from the point at which the concentration $C_1$ is present in the collecting line as compared to the point with the concentration $C_2$, the concentration cushion with the concentration $C_1$ is exposed to a higher level of back diffusion. Therefore, the concentration $C_1$ decreases on the way to the sensor 16 to a value $C_{1S}$ which is lower than the value $C_{2S}$.

Figure 8:
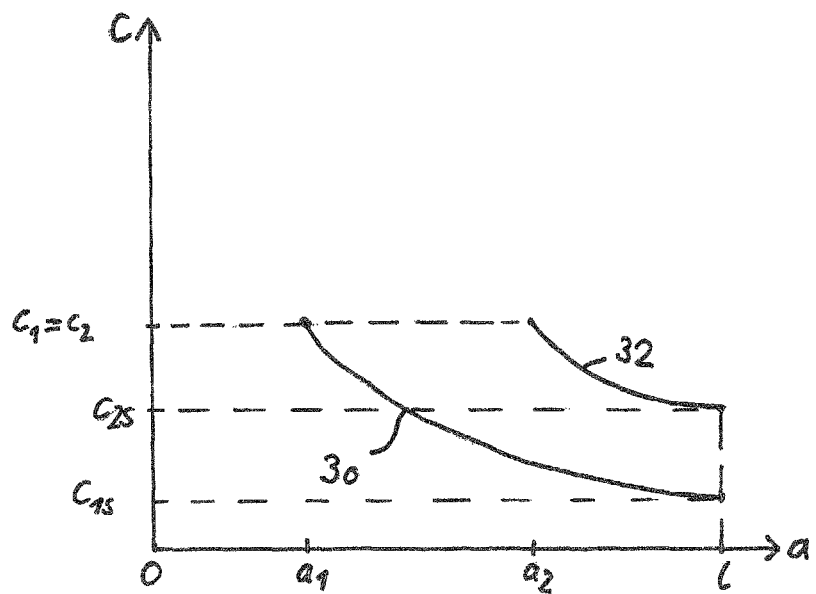
FIGS. 8 and 9 are diagrams showing a concentration of a substance to be monitored respectively plotted against a length of a collecting line according to the prior art and of a collecting line according to the invention.
Figure 9:
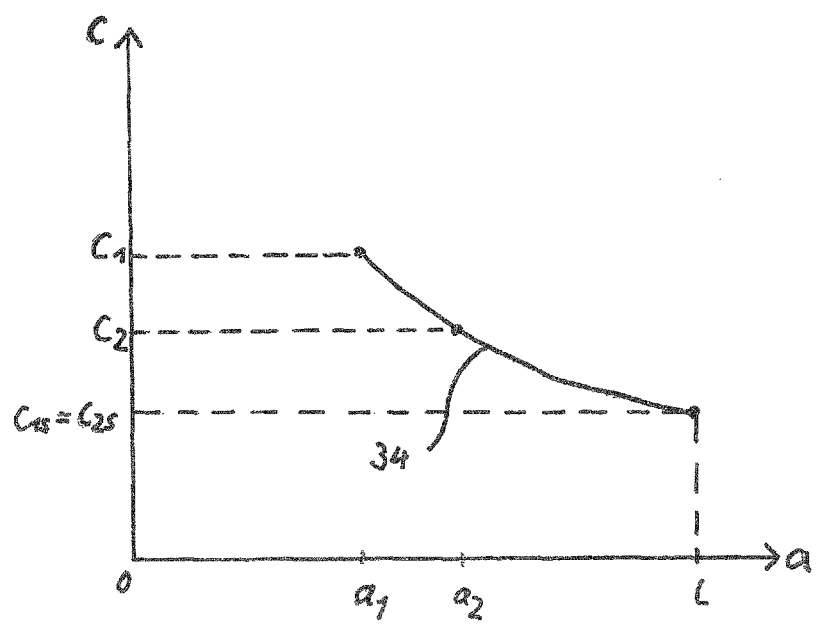

The diagram according to FIG. 9 shows the same situation as FIG. 8, but with the use of a collecting line according to the present invention.

A curve 34 illustrates a situation in which a substance S has penetrated the collecting line at distances $a_1$ and $a_2$, with the result that this substance S is present inside the collecting line as a concentration cushion with the respective concentrations $C_1$ and $C_2$. If the substance S is now pumped together with the transport medium present in the collecting line to the second end 15 of the collecting line, its concentration gradually decreases due to back diffusion, with the result that at the location of the sensor, the substance S is now available only in the respective concentrations $C_{1S}$ and $C_{2S}$.

Since the permeability of the collecting line at the distance $a_1$ is higher than at the distance $a_2$, the concentration $C_1$ of the substance S to be monitored inside the collecting line at the location $a_1$ is higher than the concentration $C_2$ at the location $a_2$. Due to the longer distance to the sensor, the back diffusion has a stronger effect on the concentration $C_1$ than on $C_2$. Therefore, identical concentration levels $C_{1S}$ and $C_{2S}$ are ideally measured at the location l of the sensor 16.

The invention claimed is:

1. A collecting line for monitoring and locating leakages at an installation, the collecting line comprising:
a body in the form of a hollow pipe having first and second ends, a longitudinal direction and a subarea extending in said longitudinal direction;
said body being permeable to a substance to be monitored, at least in said subarea;
said subarea having at least one first subsection and at least one second subsection;
said at least one first subsection being disposed at a first distance from said first end, and said at least one second subsection being disposed at a second distance from said first end being greater than said first distance; and
said at least one first subsection having a greater permeability than said at least one second subsection.

2. The collecting line according to claim 1, wherein said permeability continuously decreases from said first end in said longitudinal direction as said distances increase.

3. The collecting line according to claim 1, wherein said body is a pipe having openings formed therein, and a material being permeable to the substance to be monitored closes said openings.

4. The collecting line according to claim 3, which further comprises a layer coating said pipe and being permeable to the substance to be monitored.

5. The collecting line according to claim 4, wherein said openings define areas in said at least one first subsection and in said at least one second subsection, and said area in said at least one first subsection is larger than said area in said at least one second subsection.

6. The collecting line according to claim 5, wherein said openings are disposed in at least one row aligned in said longitudinal direction.

7. The collecting line according to claim 4, wherein said openings are disposed in at least one row aligned in said longitudinal direction.

8. The collecting line according to claim 4, wherein said material closing said openings has a greater permeability in said first subsection than in said second subsection, and said permeable layer has a smaller thickness in said first subsection than in said second subsection.

9. The collecting line according to claim 8, wherein said material closing said openings has a different composition in said first subsection than in said second subsection.

10. The collecting line according to claim 3, wherein said openings define areas in said at least one first subsection and in said at least one second subsection, and said area in said at least one first subsection is larger than said area in said at least one second subsection.

11. The collecting line according to claim 10, wherein said openings are disposed in at least one row aligned in said longitudinal direction.

12. The collecting line according to claim 3, wherein said openings are disposed in at least one row aligned in said longitudinal direction.

13. The collecting line according to claim 12, wherein said at least one row includes a greater number of rows in said first subsection than in said second subsection.

14. The collecting line according to claim 12, wherein said at least one row has a greater number of openings in said first subsection than in said second subsection.

15. The collecting line according to claim 12, wherein said openings in said first subsection are larger than in said second subsection.

16. The collecting line according to claim 3, wherein said material closing said openings has a greater permeability in said first subsection than in said second subsection.

17. The collecting line according to claim 16, wherein said material closing said openings has a different composition in said first subsection than in said second subsection.

18. A device for monitoring and locating leakages, the device comprising:
a collecting line according to claim 1; and
a sensor for the substance to be monitored, said sensor being connected to said second end of said body.

* * * * *